(12) United States Patent
Soumiya et al.

(10) Patent No.: US 9,143,446 B2
(45) Date of Patent: Sep. 22, 2015

(54) NETWORK CONTROL APPARATUS, NETWORK CONTROL SYSTEM, AND NETWORK CONTROL METHOD

(71) Applicant: FUJITSU LIMITED, Kawasaki-shi, Kanagawa (JP)

(72) Inventors: Toshio Soumiya, Yokohama (JP); Satoshi Imai, Kawasaki (JP); Sho Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 249 days.

(21) Appl. No.: 13/706,455

(22) Filed: Dec. 6, 2012

(65) Prior Publication Data

US 2013/0258879 A1 Oct. 3, 2013

(30) Foreign Application Priority Data

Mar. 29, 2012 (JP) ................................ 2012-077112

(51) Int. Cl.
*H04H 20/71* (2008.01)
*H04L 12/721* (2013.01)

(52) U.S. Cl.
CPC ...................................... *H04L 45/70* (2013.01)

(58) Field of Classification Search
CPC .............. H04J 14/0227; H04J 14/0264; H04J 14/0271; H04J 14/026; H04J 14/0257; H04J 14/0254; H04J 14/0269; H04J 14/0258
USPC ................... 398/8, 35, 57, 79; 370/237, 252; 713/340
See application file for complete search history.

(56) References Cited

U.S. PATENT DOCUMENTS

| | | | | |
|---|---|---|---|---|
| 2002/0165962 | A1* | 11/2002 | Alvarez et al. | 709/226 |
| 2003/0161633 | A1 | 8/2003 | Oki et al. | |
| 2007/0094527 | A1* | 4/2007 | Frietsch et al. | 713/340 |
| 2013/0070754 | A1* | 3/2013 | Iovanna et al. | 370/351 |

FOREIGN PATENT DOCUMENTS

JP 2003-298517 10/2003

OTHER PUBLICATIONS

Japanese Office Action mailed Jun. 30, 2015 in related Japanese Application No. 2012-077112.
Ming Xia et al., "Green Provisioning for Optical WDM Networks", IEEE Journal of Selected Topics in Quantum Electronics, vol. 17, No. 2, Mar./Apr. 2011, pp. 437-445.
Yutaka Arakawa et al., "Network Reconfigure Algorithm for Low Power Consumption", IEICE Technical Report, The Institute of Electronics, Information and Communication Engineers, Aug. 1, 2008, vol. 108, No. 183, pp. 13-18.

* cited by examiner

*Primary Examiner* — Andrew Chriss
*Assistant Examiner* — Peter Mak
(74) *Attorney, Agent, or Firm* — Staas & Halsey LLP

(57) ABSTRACT

A network control apparatus includes: a power consumption collecting unit configured to collect power consumption information measured by at least one electrical node included in an electrical layer network and at least one optical node included in an optical layer network; a cut-through range identifying unit configured to calculate an optical cut-through path based on the collected power consumption information; and a cut-through path setting instructing unit configured to instruct the electrical node and the optical node to set the optical cut-through path based on the calculation result in the cut-through range identifying unit.

13 Claims, 15 Drawing Sheets

NETWORK CONTROL APPARATUS, NETWORK CONTROL SYSTEM, AND NETWORK CONTROL METHOD

CROSS-REFERENCE TO RELATED APPLICATION

This application is based upon and claims the benefit of priority of the prior Japanese Patent Application No. 2012-77112, filed on Mar. 29, 2012, the entire contents of which are incorporated herein by reference.

FIELD

The embodiments discussed herein are related to a network control apparatus, a network control system, and a network control method.

BACKGROUND

The power consumption of network devices, such as switches and routers, is increasing and the proportion of the power consumption of the network devices in the entire Information and Communication Technology (ICT) is not negligible. Since electrical nodes, such as Internet protocol (IP) routers, perform processing in units of packets, an increase in speed and capacity of the IP routers increases the power consumption. Although the electrical energy consumed by optical nodes using technologies including Wavelength Division Multiplexing (WDM) is low, the optical nodes do not perform the information transmission in units of packet, unlike the IP routers. In addition, since WDM paths are coupled between nodes in full mesh manner in order to transfer information to all the nodes in WDM networks and, the number of wavelengths is limited.

For example, a related technology is disclosed in Japanese Laid-open Patent Publication No. 2003-298517.

SUMMARY

According to one aspect of the embodiments, a network control apparatus includes: a power consumption collecting unit configured to collect power consumption information measured by at least one electrical node included in an electrical layer network and at least one optical node included in an optical layer network; a cut-through range identifying unit configured to calculate an optical cut-through path based on the collected power consumption information; and a cut-through path setting instructing unit configured to instruct the electrical node and the optical node to set the optical cut-through path based on the calculation result in the cut-through range identifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Electrical-optical networks are going to be built, in which electrical nodes, such as IP routers, are combined with optical nodes, such as WDM transmission apparatuses. In a typical electrical-optical network, a logical path called an optical path is set to cut through the electrical nodes with which packets are relayed. Packet processing having low power efficiency for heavy traffic is reduced and the heavy traffic is transferred by using the optical path having high power efficiency to achieve power saving over the network. In the electrical-optical network, the optical path may be dynamically set for the traffic that has occurred and the traffic may be accommodated on a route having appropriate power consumption to achieve the power saving of the network. The optical path is set in consideration of the power consumption of a normal path including the electrical nodes, the power consumption when the optical path is set, and logical topology to determine a route having the minimum increment of the power consumption.

Figure 1:
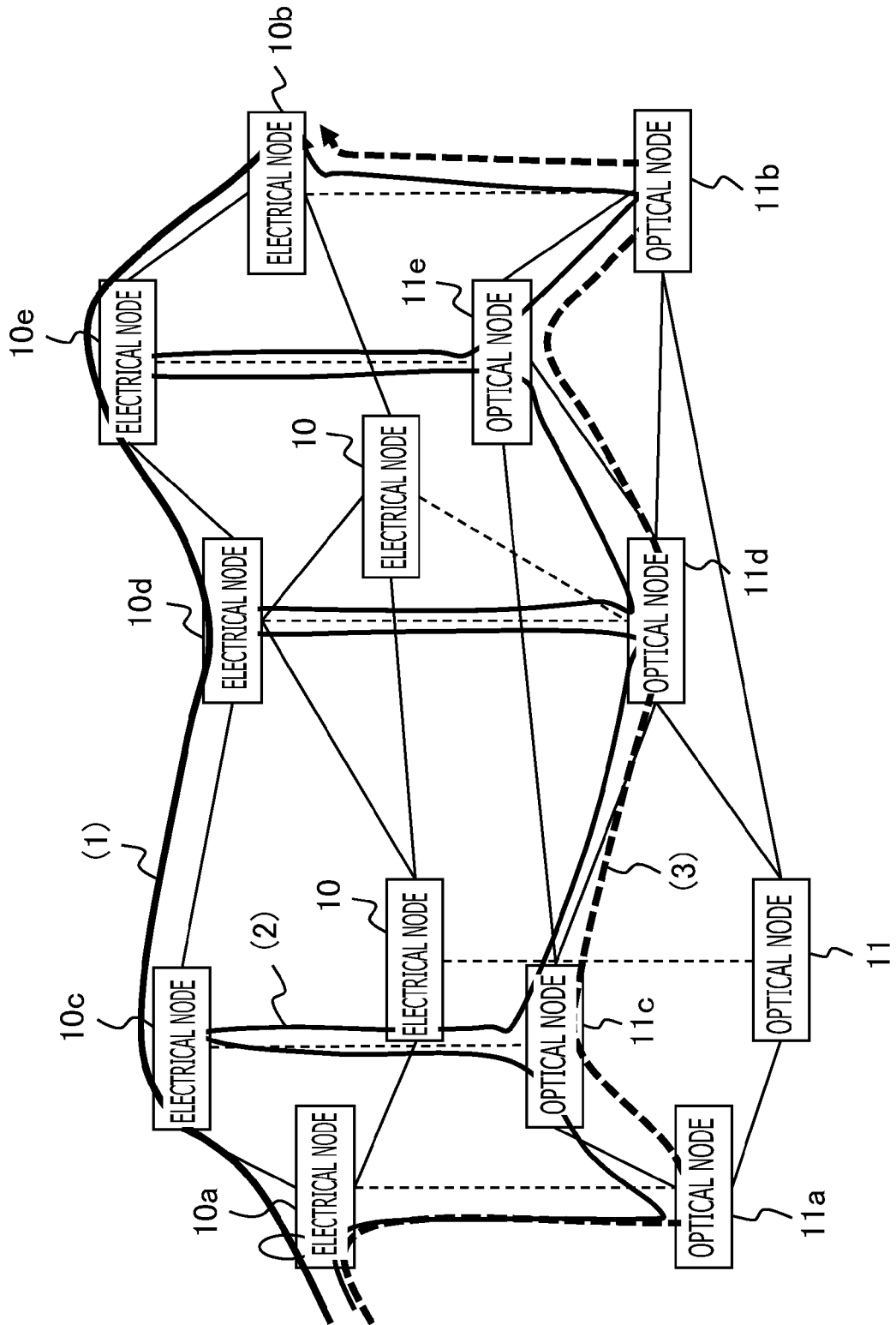
FIG. 1 illustrates an exemplary electrical-optical network.

FIG. 1 illustrates an exemplary electrical-optical network. Referring to FIG. 1, electrical nodes 10a to 10e are provided in association with optical nodes 11a to 11e, respectively, in the electrical-optical network. A logical route is provided between the electrical nodes to form, for example, an Ethernet (registered trademark) path or a Multi-Protocol Label Switching (MPLS) path. The optical nodes form an optical network and, for example, a wavelength path or an Optical Transport Network (OTN) path is formed in the optical network. A packet from the electrical node 10a to the electrical node 10b is transmitted through a logical path (1) (thick line) formed of the electrical nodes 10a to 10e. For example, a packet input into the electrical node 10a is converted into an optical signal that is transmitted to the optical node 11a, as illustrated by a thin line (2). The optical signal is transmitted from the optical node 11a to the optical node 11c and, then, is transmitted to the electrical node 10c. After the optical signal is converted into an electrical packet in the electrical node 10c, the electrical packet is routed and is converted into an optical signal that is transmitted to the optical node 11d via the optical node 11c. The optical signal reaching the optical node 11d is transmitted to the electrical node 10d. After the optical signal is converted into an electrical packet in the electrical node 10d, the electrical packet is routed and is converted into an optical signal that is transmitted to the optical node 11d. The optical signal is transmitted from the optical node 11d to the optical node 11e and, then, is transmitted to the electrical node 10e. After the optical signal is converted into an electrical packet in the electrical node 10e, the electrical packet is routed and is converted into an optical signal that is transmitted to the optical node 11e. The optical node 11e transmits the optical signal to the optical node 11b and the optical node 11b transmits the optical signal to the electrical node 10b. The electrical node 10b converts the optical signal into an electrical packet, routes the electrical packet, and transfers the packet to a user.

In order to transmit the packet from the electrical node 10a to the electrical node 10b, a route alternately passing through the electrical nodes and the optical nodes is used. In order to efficiently transmit information, a cut-through path that does not pass through the electrical nodes may be set from an input node to an output node. In the setting of the cut-through path, the optical nodes 11c, 11d, and 11e do not transfer the signal to the corresponding electrical nodes and the optical signal is transferred from the optical node 11a to the optical node 11b in a manner illustrated by a broken line (3).

In a multilayer optical network, autonomous setting, change, or release of the optical path is performed in accordance with the demand for an electrical path.

When congestion information is used to control the optical path, the congestion of the electrical nodes is reduced but the power consumption may not be considered. When the IP routers are used as the electrical nodes, the IP routers may determine an optical path that is newly set on an optical layer to be a new route and may use a routing protocol to advertise the new path in an IP layer.

The respective routers exchange their own route information with each other by using the routing protocol in an IP network in order to calculate the route in an autonomous distributed manner. For example, when a new route is added, the route information is exchanged between the routers and route calculation is performed by using the new route information. For example, all the routers exchange the route information with each other based on the addition of the new route. When the new route becomes a shortest route, the new route is selected and IP packets are transferred through the new route.

For example, when a new optical path is added by the cut-through, the new optical path is used to perform routing calculation and route switching in the IP network. Accordingly, the network may temporarily become unstable.

A method of transferring information between the electrical nodes, such as the IP routers, and the optical nodes, such as the WDM transmission apparatuses, may be controlled in accordance with the amount of power consumption of each node to achieve the power saving in the entire network.

Since the power consumption is used as an index and the traffic is accommodated in a combination of a transfer mechanism of the electrical nodes and a transfer mechanism of the optical nodes based on the usage of the power at the nodes, the power saving in the entire network may be achieved. The power consumption of each port is measured and collected in each node in the electrical nodes and the optical nodes and the collected power consumption is held in a database. Whether the traffic is accommodated in the electrical layer or in the optical layer is selected based on power consumption characteristics of the nodes. If the accommodation of the traffic in the optical layer is selected, an optical cut-through path is set in the optical layer and the traffic is accommodated on the optical path. Since the optical cut-through path set in the optical layer does not perform the advertisement in the electrical layer, the stability of the electrical layer may be improved. A message that a power saving operation is to be performed is transferred to the path (the electrical layer) on the route before the optical cut-through path is set, so that devices, such as line interfaces, on the transfer route may be set to a power saving operation state to achieve the power saving.

Figure 2:
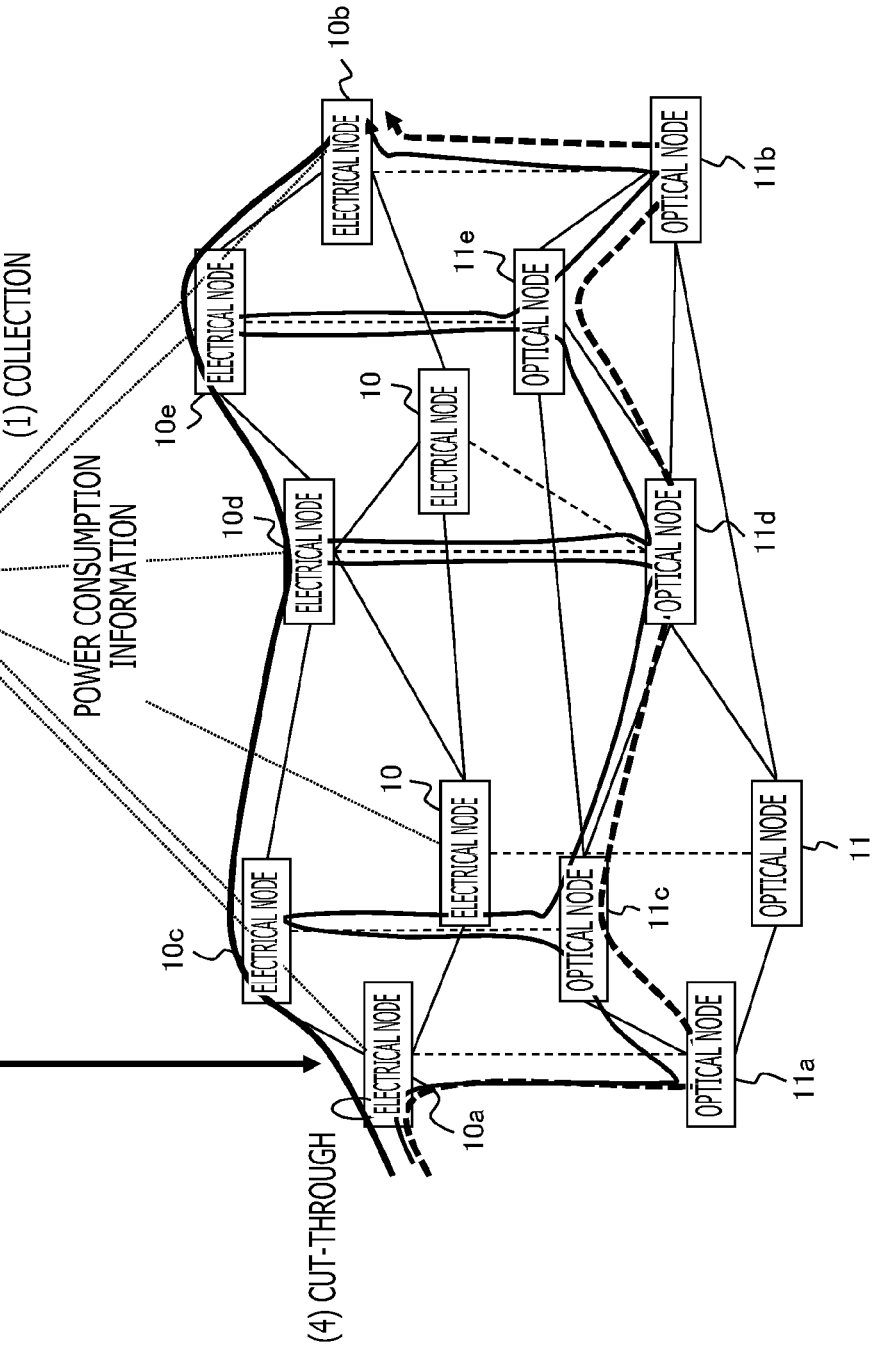
FIG. 2 illustrates an exemplary configuration of a network.

FIG. 2 illustrates an exemplary configuration of a network. The network includes an electrical layer including electrical nodes 10 and the electrical nodes 10a to 10e, such as the IP routers or Ethernet switches, which transfer information by electrical processing; an optical layer including an optical node 11 and the optical nodes 11a to 11e which transfer information by using an optical processing technology, such as the WDM; and a management server 20 that controls the entire network.

A logical transfer route (thick line) is managed in the electrical layer. Only the logical transfer route may be managed in the electrical layer. In the IP routers or the likes, for example, the route of the optical path of optical transmission apparatuses existing in a lower layer may not be managed and the transmission from the input node to the output node of the traffic flow may be performed based on the electrical nodes and the connection configuration of the electrical nodes. For example, in the network, the optical path may be set between the optical nodes in the optical layer to perform long-distance information transfer (thin line).

The electrical node 10a, which is the input node, has a function to set the cut-through path to the electrical node 10b, which is the output node, a function to bypass the traffic flow, and/or a function not to advertise the cut-through path in the electrical layer. Each node in the electrical nodes 10, the electrical nodes 10a to 10e, the optical node 11, and the optical nodes 11a to 11e has a function to measure and collect the power consumption of each functional block. The power consumption may be collected for every kind of the line interfaces, for example, for every functional block, such as a common part that accommodates the line interfaces. The management server 20 has a function to collect the power consumption that is measured and collected in each node, a function to hold information about the power consumption in a database, and/or a function to determine whether the optical cut-through path is to be set based on the information about the power consumption (a function to estimate the effect of the power saving). The management server 20 also has a function to calculate the route of the optical cut-through path and/or a function to instruct the setting of the cut-through path between the input node and the output node.

In the network, (1) power information is collected in each node; (2) the management server 20 determines, for example, whether the power saving is capable of being achieved; (3) the management server 20 instructs the setting of the path; and (4) the optical cut-through path is set and the route switching is performed. Power saving network control is performed depending on the status of the network. In the collection of the power information, the power consumption may be collected for every line interface. In the determination of the power saving, the management server 20 collects the power consumption from each node, calculates the route when the cut-through path is performed, and determines whether the power saving effect is achieved. If the power saving effect is achieved, the management server 20 sets the cut-through path. In the instruction of the setting of the path, the management server 20 instructs each node in the network to set the cut-through path having the power saving effect. In the route switching, the electrical nodes 10 and the electrical nodes 10a to 10e set the cut-through path, set the path that bypasses the traffic, and/or do not advertise other electrical nodes that are not included in the cut-through path of the cut-through path. Accordingly, a path indicated by a thick broken line is set.

Figure 3:
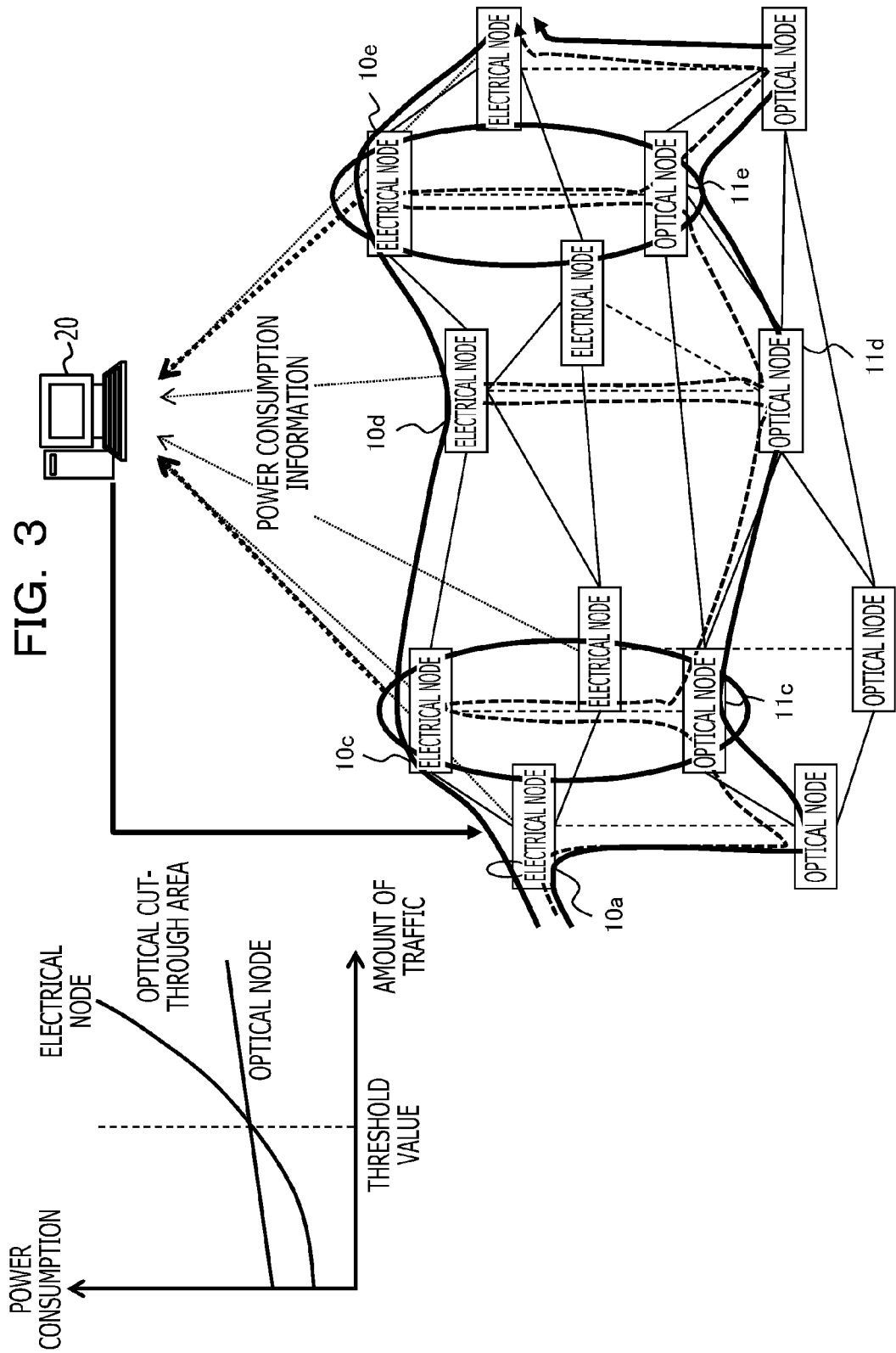
FIG. 3 illustrates an exemplary power saving network control.
Figure 4:
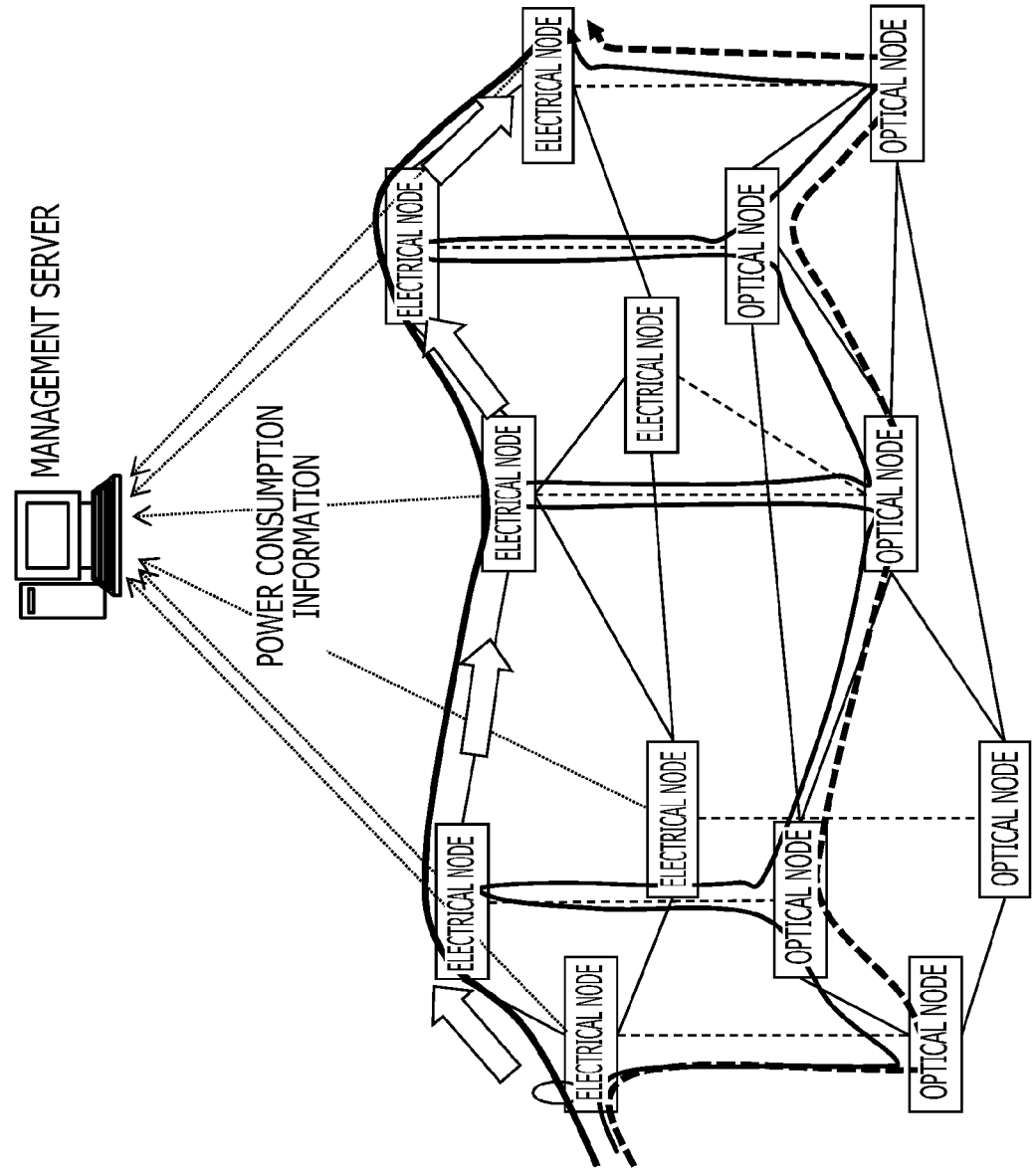
FIG. 4 illustrates an exemplary power saving network control.

FIG. 3 and FIG. 4 illustrate an exemplary power saving network control. Referring FIG. 4, a thick line denotes a logical path, a thin line denotes a path without the cut-through, and a thick broken line denotes a path resulting from the cut-through.

Referring FIG. 3, the control is performed by using the power information as a trigger. The electrical nodes 10c and 10e are managed in association with the optical nodes 11c and 11e, respectively, which accommodate the electrical nodes 10c and 10e, in the network in FIG. 3. If the power consumption of the electrical nodes exceeds a predetermined threshold value, it is determined that an excess in the power occurs. As illustrated in the power consumption characteristics on the left side in FIG. 3, the power consumption of the electrical nodes 10c and 10e is lower than the power consumption of the optical nodes when the amount of traffic is small. However, the power consumption of the electrical nodes 10c and 10e tends to be higher than the power consumption of the optical nodes when the amount of traffic is increased. The positions of the electrical nodes 10c and 10e where the power consumption is high are identified and the traffic flow passing through the electrical nodes 10c and 10e whose positions are identified is accommodated in the optical layer to reduce the power consumption. The accommodation in the optical layer means that the electrical nodes are separated and only the optical nodes 11c and 11e are set so as to be included in the path. When the multiple electrical nodes 10c and 10e determined to have the high power consumption are extracted, it is determined whether the common traffic flow passing through the multiple electrical nodes 10c and 10e is accommodated in the optical layer. If the traffic flow is accommodated in the optical layer, the management server 20 instructs the input node, for example, the electrical node 10a where the traffic flow is terminated to set the cut-through path. The setting of the cut-through path is performed in each node.

The threshold value may be a value indicating a time when the power consumption of the electrical nodes exceeds the power consumption of the optical nodes. For example, the power consumption characteristics on the left side in FIG. 3 may be held in the form of a table. In this case, it may be determined that the excess in the power occurs by using the amount of traffic when the amount of power consumption of the electrical nodes becomes larger than the amount of power consumption of the optical nodes.

Referring to FIG. 4, the effect of the optical cut-through on the IP layer is reduced. The optical cut-through path set in the optical layer may be a temporary path for reducing the power consumption. Accordingly, the traffic flow is returned to the original route when the power consumption is decreased and the optical cut-through path that is set is removed. For example, upon setting of a new route, the IP routers use the routing protocol to advertise the IP network of the route. The IP network, which has received the advertisement, performs the routing calculation to find an optimal route based on the new route. Since the route setting in each IP router is not unified during the calculation, the transfer route may become unstable in the IP network. The stability of the transfer route in the IP layer may be improved at the input and output electrical nodes where the cut-through path is set because the route is not advertised in the electrical layer.

Since the message to instruct the power saving is transferred to the original route in the electrical layer, the line interfaces of the electrical nodes may be switched to a power saving mode depending on the situation. When the message to instruct the power saving is not transferred, the management server 20 may directly issue a power saving instruction to each node.

The electrical nodes that have bypassed the traffic flow to the optical cut-through path may not advertise the bypass route in an electrical layer network. In the electrical layer, (1) a message that the optical cut-through is being performed is notified to the original route; (2) the relay (electrical) nodes on the original route, which have received the message that the optical cut-through is being performed, set the ports to the power saving mode depending on the amount of traffic; and (3) the notification message is terminated at the termination node of the cut-through path.

The optical cut-through path is set based on an instruction from the management server 20. For example, since no advertisement is published when the optical cut-through path is set based on the instruction from the management server 20, the time when the optical cut-through path is set may be discriminated from the normal time.

At the normal time, upon setting of a new route, for example, when neighbor routers are found based on transmission of Hello packets in the routing protocol, such as Open Shortest Path First (OSPF), the neighbor routers are registered in a database. The Hello packets may not be transmitted to the routers that are not included in the optical cut-through path.

Figure 5:
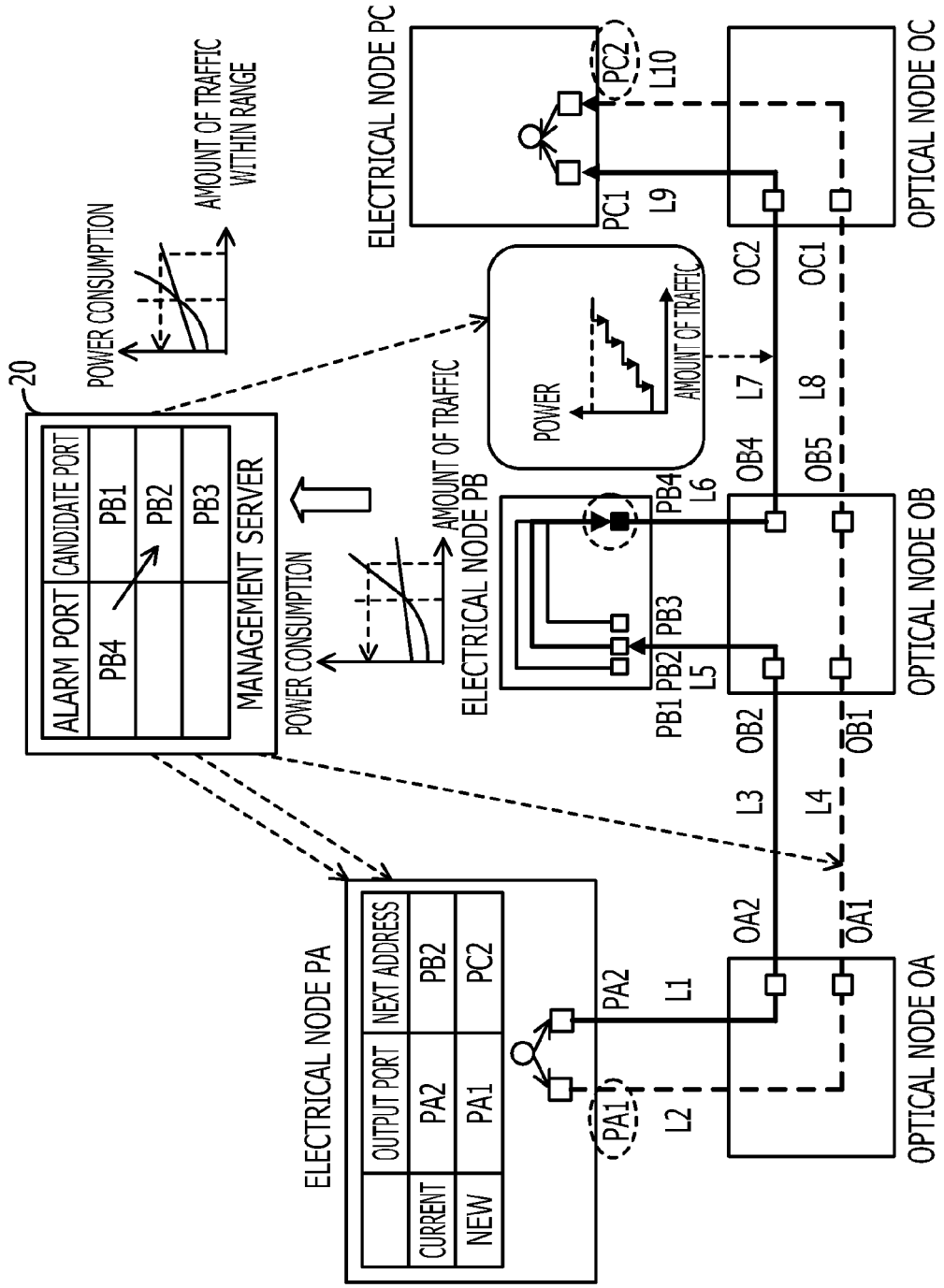
FIG. 5 illustrates an exemplary power saving network control.

FIG. 5 illustrates an exemplary power saving network control. Referring to FIG. 5, an electrical node PB is managed in association with an optical node OB. If the power consumption of a line interface PB4 of the electrical node PB exceeds a threshold value, the management server 20 identifies the input port, for example, a port PB2 through which the highest traffic, among the traffics input into the line interface PB4, is transmitted from candidate ports. The candidate ports may include all the ports coupled to the line interface PB4. Since the port PB2 is coupled to a port PA2 of an electrical node PA, the route when the optical cut-through path is set at the electrical node PA is extracted by the management server 20. For example, the route of the cut-through path may be PA1-OA1-OB1-OB3-OC1-PC2. The management server 20 calculates the current power consumption and the power consumption when the cut-through path is set. If the management server 20 determines that the power consumption is decreased when the traffic is accommodated in the cut-through path, the management server 20 issues an instruction to set the cut-through path to the electrical node PA. The electrical node PA sets the cut-through path to an electrical node PC but does not advertise the electrical layer of the route. The management server 20 issues a cut-through instruction to the electrical node PA and the electrical node PA bypasses the traffic. For example, the power saving operation of the ports is performed in each line interface on the original route to achieve the power saving.

For example, the power consumption is increased in the line interface PB4 of the electrical node PB. If the power consumption exceeds a threshold value, for example, the power consumption value of the optical nodes, (1) a power consumption alarm determining unit 32 outputs an alarm. The management server 20 uses the alarm as a trigger to calculate an area where the line interface PB4 is cut through, for example, a route that bypasses the line interface PB4 in the network. The area may be a route L2-L4-L8-L10. The management server 20 compares the sum of the power consumption in all the line interfaces on the current route (L1-L3-L5-L6-L7-L9) with the sum of the power consumption in the line interfaces on the cut-through route. (2) The management server 20 determines whether the cut-through path is to be set. If the management server 20 determines that the cut-through path is to be set, (3) the management server 20 instructs each node to set the cut-through path. (4) The electrical node PA does not advertise the electrical layer of this path. (5) The management server 20 issues an instruction to switch to the cut-through path. Then, if the line interfaces on the original route are not used, (6) the management server 20 issues the power saving instruction to the line interfaces.

Figures 6A, 6B:
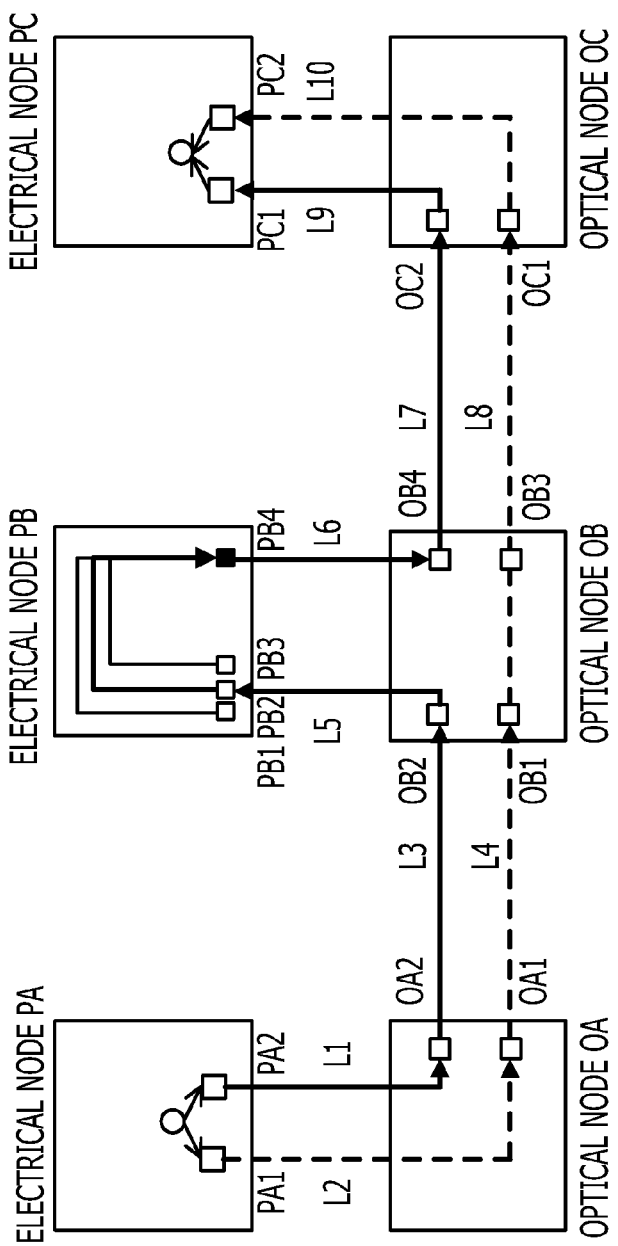
FIG. 6A and FIG. 6B illustrate an exemplary power consumption.

FIG. 6A and FIG. 6B illustrate an exemplary power consumption. Referring to FIG. 6B, the power consumption of the line interface PB4 of the electrical node PB is high. FIG. 6A illustrates a table in which the current power consumption value of each node of the management server 20 and an estimated power consumption value of each node of the management server 20 after the cut-through are registered.

Identifiers (IDs) of the respective electrical nodes and optical nodes in the network managed by the management server 20 are registered in the table in FIG. 6A. The table includes the current power consumption value measured by the node indicated by each ID and the estimated power consumption value of the node indicated by each ID when the cut-through is performed. In the calculation of the estimated power consumption value when the cut-through is performed, zero watts are set for the power consumption of the ports that are disabled by the cut-through, the original measured values are set for the power consumption of the ports that have been used before the cut-through, and the set values are added up.

A total power consumption PB of the electrical node PB is indicated by the sum of a power consumption $PB_i$ of each port. For example, the total power consumption PB may be calculated according to the following equation:

$$PB=\Sigma PB_i=PB2+PB4=600\ W.$$

If the sum is higher than or equal to a predetermined threshold value, an alarm is set. The threshold value may be the amount of power consumption of the optical nodes when a certain amount of traffic is given. The power consumption may be measured and the measured power consumption may be registered in the table for every amount of traffic.

For example, the power consumption before the cut-through may be calculated according to the following equation:

$$PA2+OA2+OB2+PB2+PB4+OB4+OC2+PC1-\alpha=800\ W-\alpha=800\ W-200\ W=600\ W.$$

In this equation, α denotes the amount of power consumption caused by the traffic input into the line interface PB4 from ports PB1 and PB3. For example, the power consumption after the cut-through may be calculated according to the following equation: $PA1+OA1+OB1+OB3+OC1+PC2=400\ W$. Since the power consumption before the cut-through>the power consumption after the cut-through, the cut-through may be performed.

Figure 7:
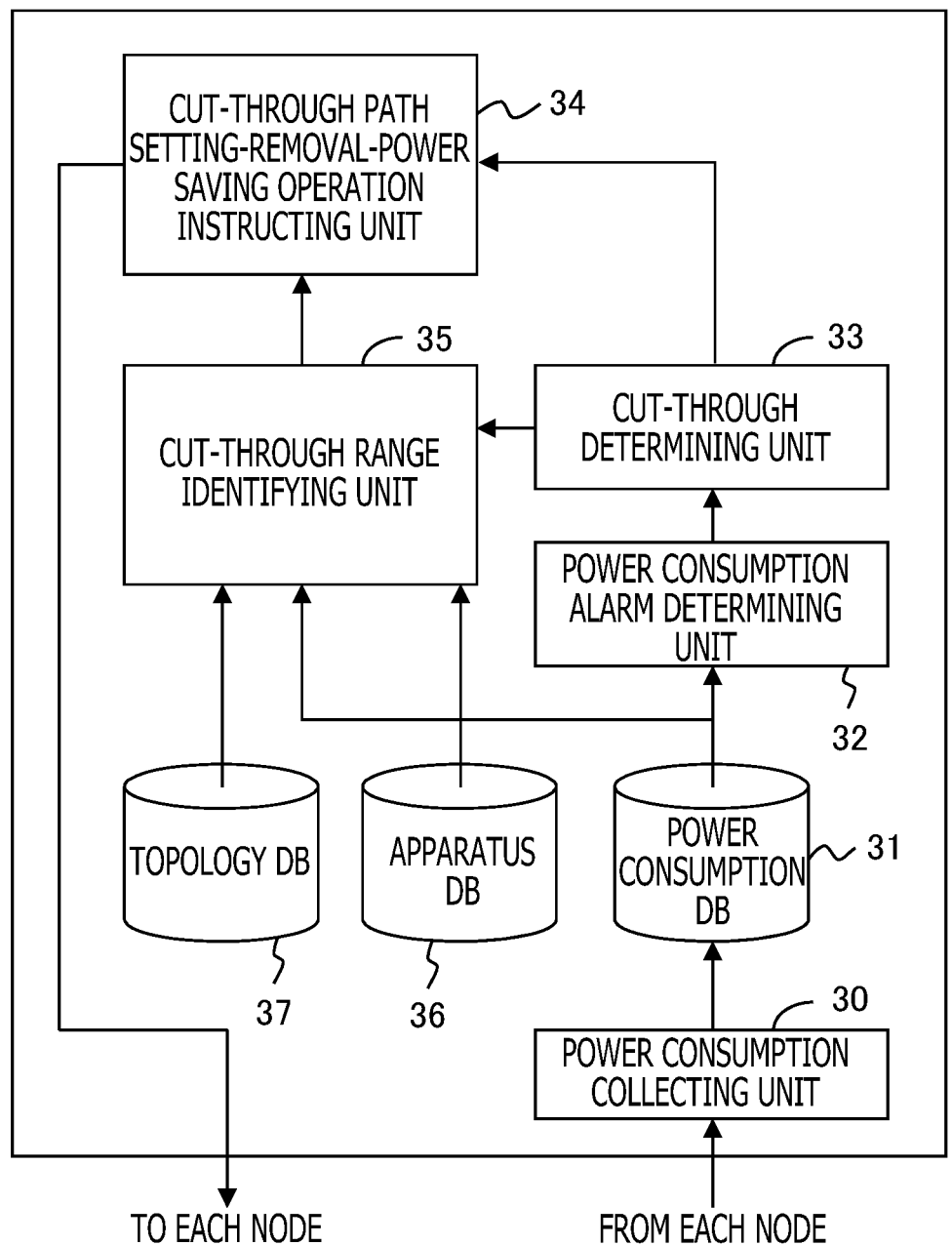
FIG. 7 illustrates an exemplary configuration of a management server.

FIG. 7 illustrates an exemplary configuration of a management server. In the management server in FIG. 7, information about the power consumption from each node is received by a power consumption collecting unit 30. The received power consumption is stored in a power consumption database (DB) 31. The power consumption alarm determining unit 32 determines whether the power consumption of any electrical node exceeds a threshold value based on the measured values of the power consumption in the power consumption DB 31. If the power consumption of any electrical node exceeds the threshold value, the power consumption alarm determining unit 32 outputs an alarm. A cut-through determining unit 33 inquires a network range to be subjected to the cut-through of a cut-through range identifying unit 35. The cut-through range identifying unit 35 reads out topology information about the network and information about the apparatus, which the management server has, from a topology DB 37 and an apparatus DB 36 to identify a range to be subjected to the cut-through. The cut-through range identifying unit 35 calculates the estimated amount of power consumption when the cut-through is performed and the current amount of power consumption. The cut-through determining unit 33 determines whether the amount of power consumption when the cut-through is performed is low based on the amount of power consumption calculated by the cut-through range identifying unit 35. If the amount of power consumption when the cut-through is performed is low, the cut-through determining unit 33 instructs a cut-through path setting-removal-power saving operation instructing unit 34 to start a cut-through operation. The cut-through path setting-removal-power saving operation instructing unit 34 acquires the network range to be subjected to the cut-through from the cut-through range identifying unit 35 and instructs each node to perform the cut-through. The cut-through path setting-removal-power saving operation instructing unit 34 instructs the ports of the electrical nodes that are disabled by the cut-through to perform the power saving operation.

Figure 8:
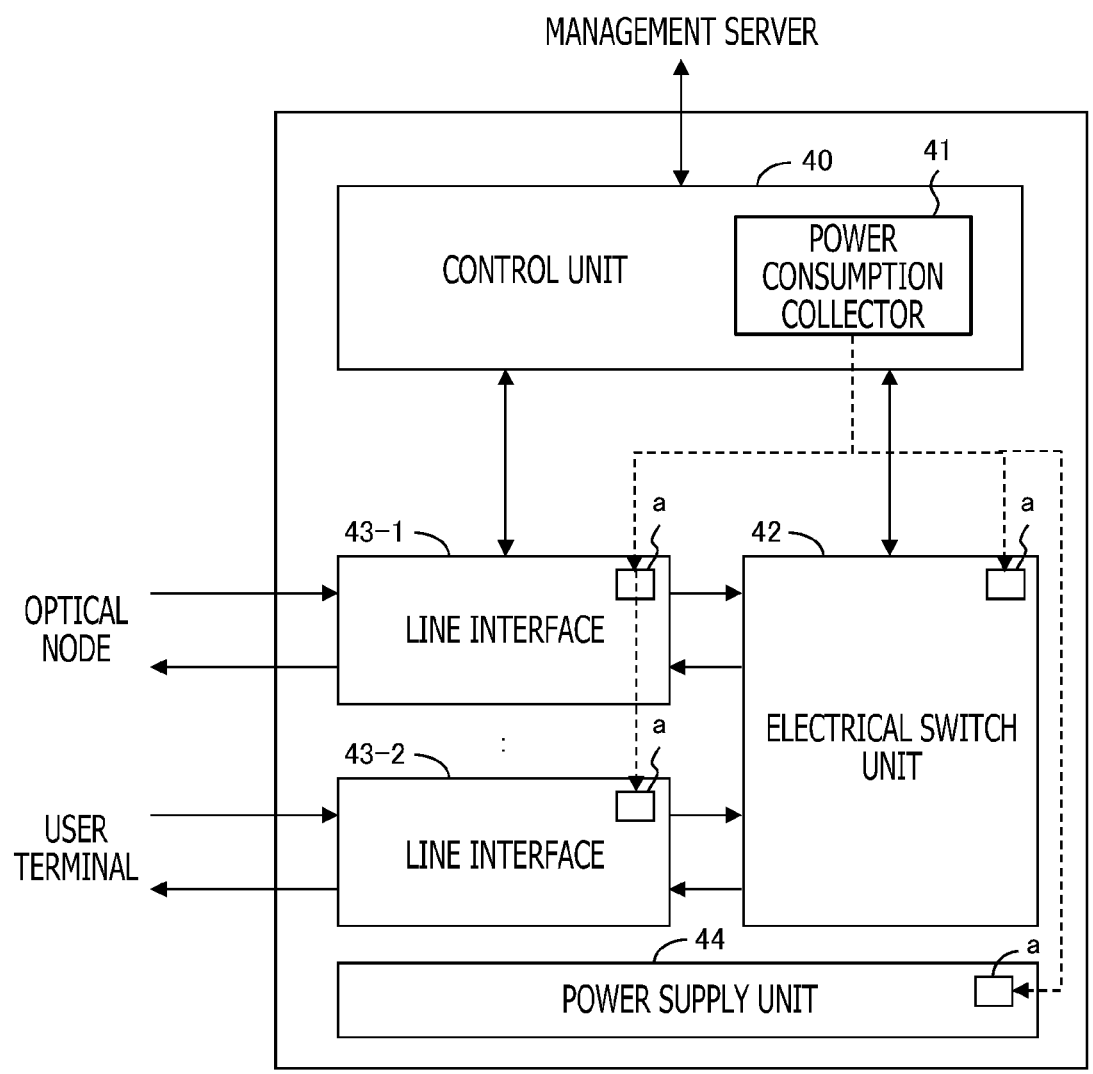
FIG. 8 illustrates an exemplary configuration of an electrical node.

FIG. 8 illustrates an exemplary configuration of an electrical node. Referring to FIG. 8, line interfaces 43-1 and 43-2 are coupled to the corresponding optical node via an optical line and are coupled to a user terminal via an electric line. When the signal received by the line interfaces 43-1 and the 43-2 is an optical signal, the optical signal is converted into an electrical signal and the electrical signal is supplied to an electrical switch unit 42. When the signal received by the line interfaces 43-1 and 43-2 is a signal transmitted from the user terminal, the signal is supplied to the electrical switch unit 42 without conversion. The electrical switch unit 42 routes the signal input through each port. The line interfaces 43-1 and the 43-2 and the electrical switch unit 42 may be controlled by a control unit 40. The control unit 40 communicates with the management server. The line interfaces 43-1 and the 43-2, the electrical switch unit 42, and the control unit 40 are driven by power supplied from a power supply unit 44. The control unit 40 includes a power consumption collector 41 that collects the results of measurement of the power consumption with the line interfaces 43-1 and the 43-2, the power supply unit 44, and the electrical switch unit 42. In order to collect the results of measurement of the power consumption, a power consumption measurer is provided in each of the line interfaces 43-1 and the 43-2, the electrical switch unit 42, and the power supply unit 44. The power consumption measurement values collected by the power consumption collector 41 are transmitted to the management server.

Figure 9:
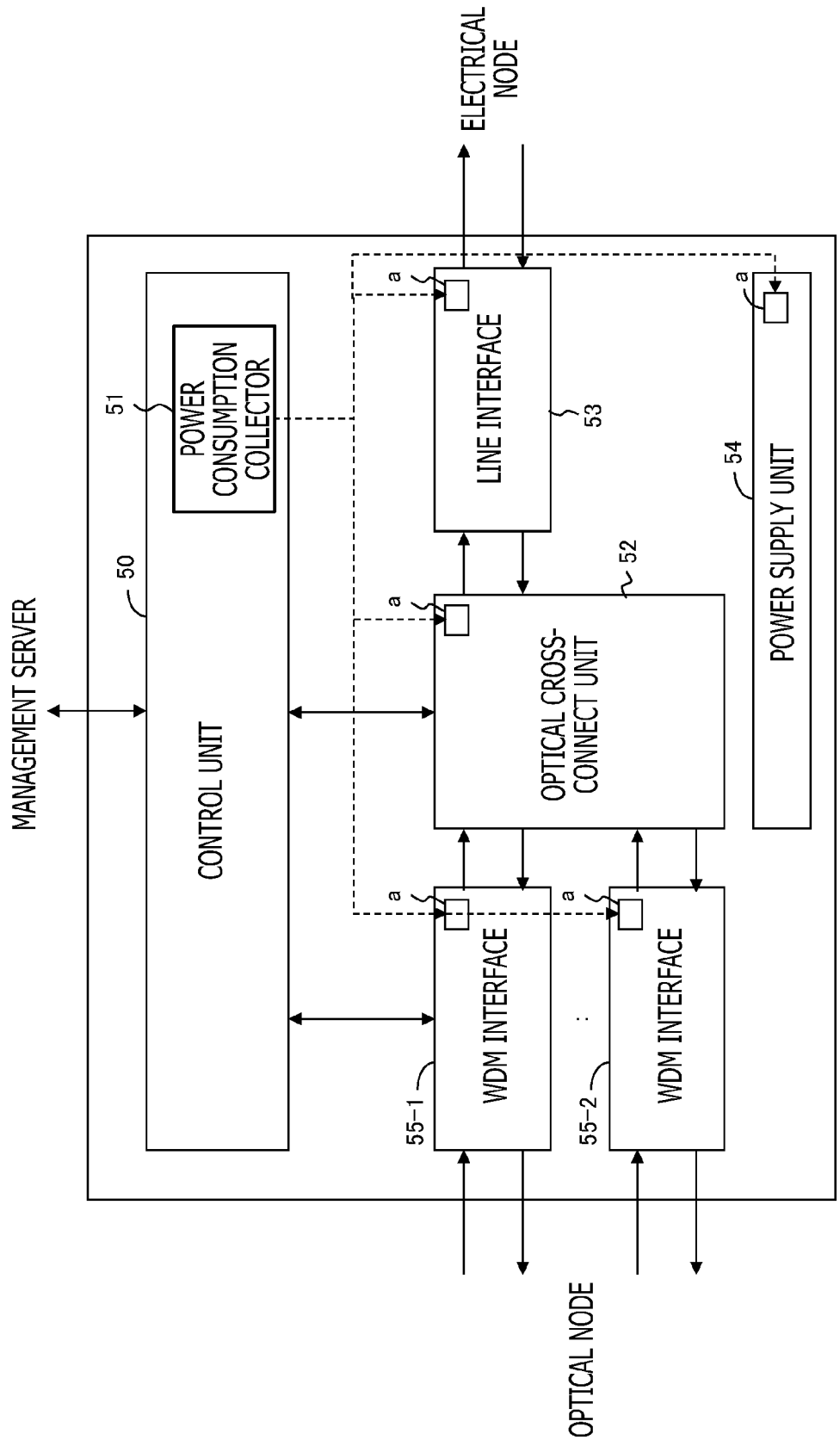
FIG. 9 illustrates an exemplary configuration of an optical node.

FIG. 9 illustrates an exemplary configuration of an optical node. Referring to FIG. 9, a line interface 53 is coupled to the electrical node. WDM interfaces 55-1 and 55-2 are coupled to other optical nodes. The signals received by the line interface 53 for optical-electrical (O/E) conversion and the WDM interfaces 55-1 and 55-2 are supplied to an optical cross-connect unit 52. The optical cross-connect unit 52 performs switching and connection to the optical signal input through each port. The line interface 53, the WDM interfaces 55-1 and 55-2, and the optical cross-connect unit 52 are controlled by a control unit 50. The control unit 50 communicates with the management server. The line interface 53, the WDM interfaces 55-1 and 55-2, the optical cross-connect unit 52, and the control unit 50 are driven by power supplied from a power supply unit 54. The control unit 50 includes a power consumption collector 51 that collects the results of measurement of the power consumption with the line interface 53, the WDM interfaces 55-1 and 55-2, the power supply unit 54, and the optical cross-connect unit 52. In order to collect the results of measurement of the power consumption, a power consumption measurer is provided in each of the line interface 53, the WDM interfaces 55-1 and 55-2, the optical cross-connect unit 52, and the power supply unit 54. The power consumption measurement values collected by the power consumption collector 51 are transmitted to the management server.

Figures 10A, 10B:
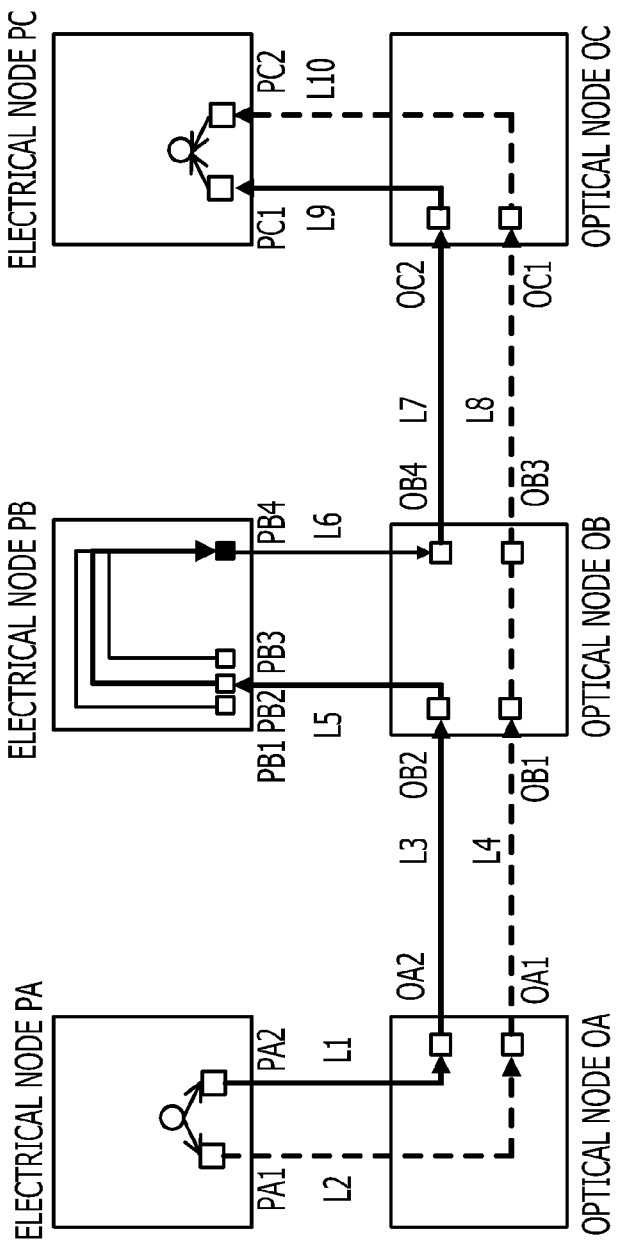
FIG. 10A illustrates an exemplary table.
FIG. 10B illustrates an exemplary configuration of a network.

FIG. 10A illustrates an exemplary table. For example, the topology information and the power consumption which the management server has may be registered in the table illustrated in FIG. 10A.

FIG. 10B illustrates an exemplary configuration of a network. The state of the network illustrated in FIG. 10B is substantially the same as or similar to the state of the network illustrated in FIG. 5.

Referring to FIG. 10A, the next hop, which is the ID of the next destination of communication of each node, for example, the next address is registered in the table in association with the node ID of each optical node and each electrical node. The type and the bandwidth of the link from the node indicated by each node ID to the node indicated by the next hop are also registered in the table. The current amount of power consumption and the estimated amount of power consumption after the cut-through of the node indicated by each node ID are further registered in the table. The current amount of power consumption and the estimated amount of power consumption after the cut-through are registered for each port. In the calculation of the amount of power consumption of the entire path, the amounts of power consumption of the respective ports included in the path are summed up.

Figure 11:
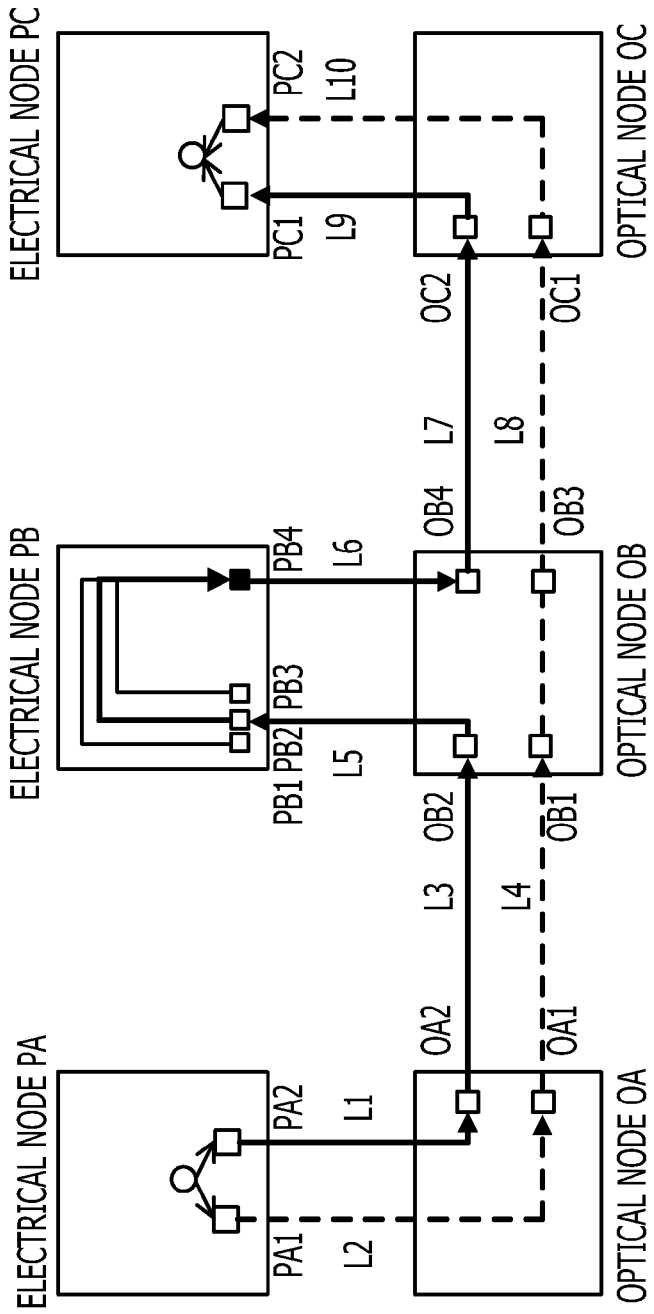
FIG. 11 illustrates an exemplary process without advertizing.

FIG. 11 illustrates an exemplary a process without advertizing. In the example in FIG. 11, a new path is not advertised in the cut-through.

In the setting of a new path, Link State Advertisement (LSA) is exchanged between the routers to allow all the routers in the area to share the database.

Although the exchange of the database is performed between the routers for which the new path is set, the exchange of the database with the electrical nodes other than the next hop, for example, the other routers may not be performed.

After a cut-through path (L2-L4-L8-L10) is generated, PC2* is set in the routing table of the electrical node PA as the next hop. PC2* may be recognized as the next hop set by the cut-through and the electrical node PA may not advertise the electrical nodes other than the next hop of the information.

The electrical nodes other than the next hop may be the electrical nodes that are not included in the cut-through path. When all the electrical nodes belonging to the network are advertised of information about the new path, the network may become unstable during the time to perform the routing calculation, for example, for several tens of minutes or one hour. The notification of the information about the new path only to the electrical nodes included in the cut-through path or to multiple specific electrical nodes may reduce the occurrence of the state in which the network becomes unstable.

Figure 12:
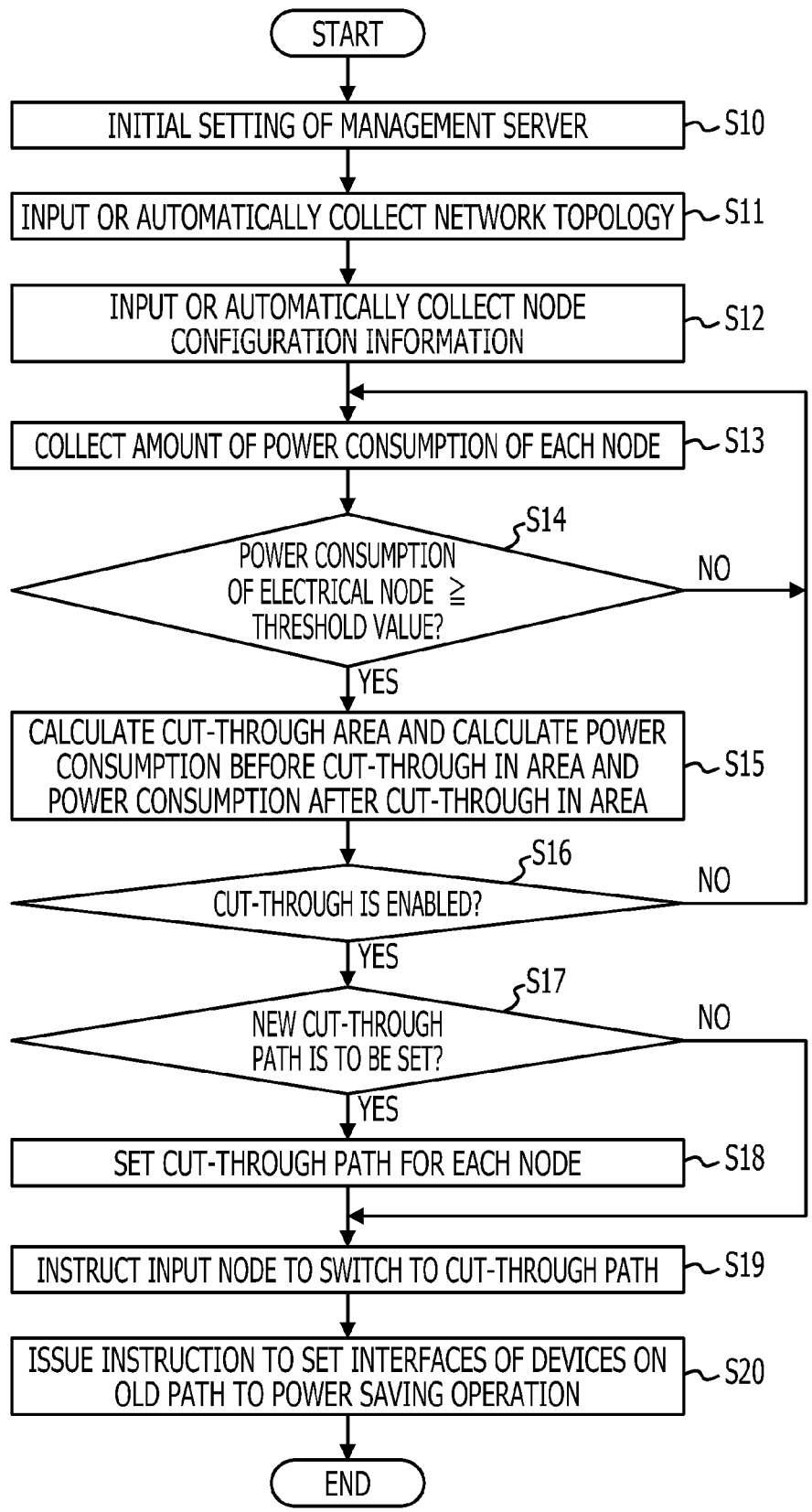
FIG. 12 illustrates an exemplary process of a management server.
Figure 13:
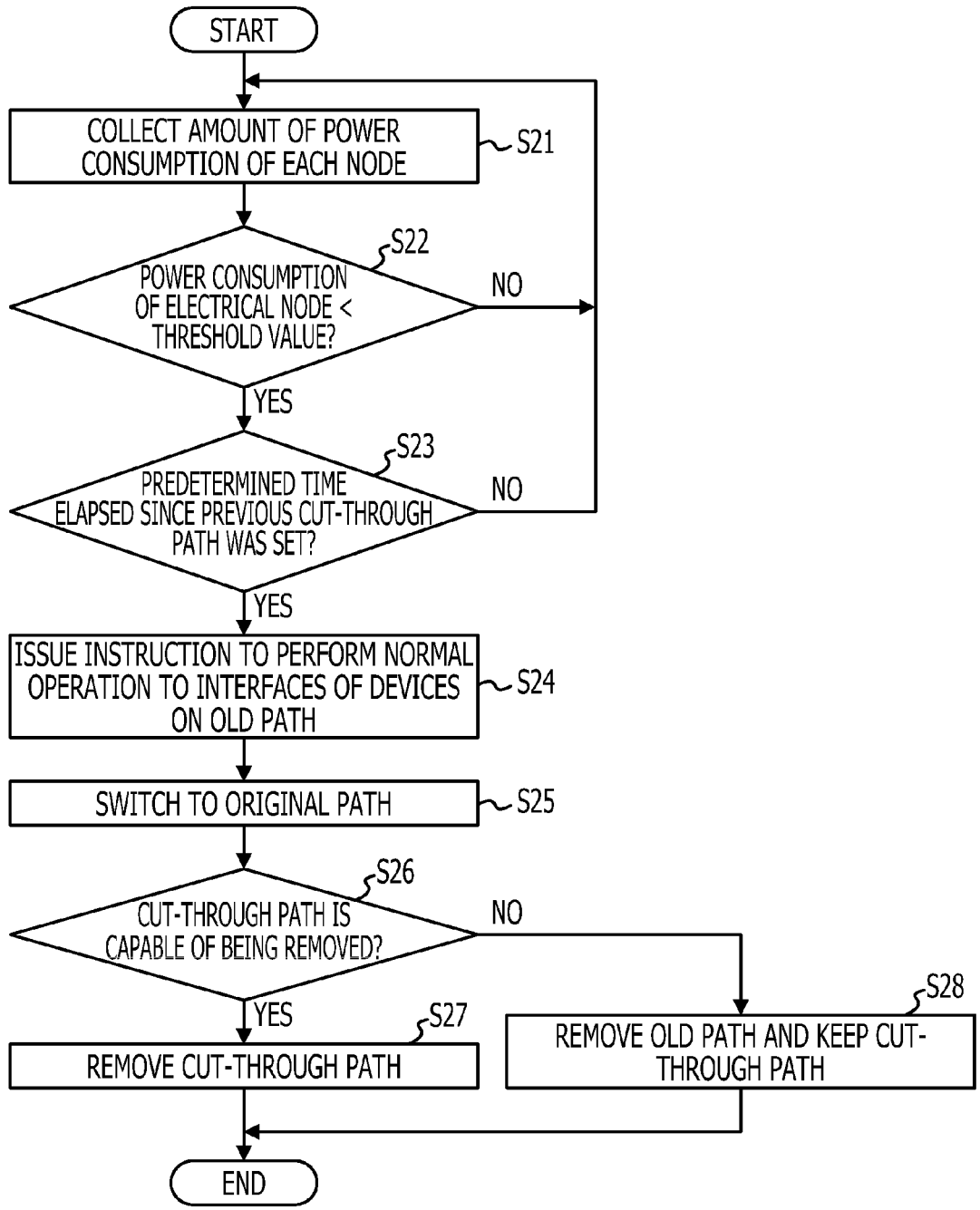
FIG. 13 illustrates an exemplary process of a management server.

FIG. 12 and FIG. 13 illustrate exemplary processes of a management server. FIG. 12 illustrates an exemplary process when the cut-through path is set. Referring to FIG. 12, in an operation S10, the initial setting of the management server is performed. In an operation S11, network topology is input by a manager or is automatically collected by a network to be managed. In an operation S12, node configuration information is input by the manager or is automatically collected by the network to be managed. In an operation S13, the amount of power consumption of each node is collected. In an operation S14, it is determined whether the power consumption of the electrical node is higher than or equal to a threshold value. If the power consumption of the electrical node is lower than the threshold value (No in Operation S14), the process goes back to the operation S13. If the power consumption of the electrical node is higher than or equal to the threshold value (Yes in Operation S14), in an operation S15, the range (area) of the network to be subjected to the cut-through is calculated and the power consumption before the cut-through in the area and the power consumption after the cut-through in area are calculated. In an operation S16, it is determined whether the cut-through is enabled. It may be determined that the cut-through is enabled when the power consumption after the cut-through is lower than the power consumption before the cut-through. If the power consumption after the cut-through is higher than the power consumption before the cut-through (No in the operation S16), the process goes back to the operation S13. If the power consumption after the cut-through is lower than the power consumption before the cut-through (Yes in the operation S16), in an operation S17, it is determined whether a new cut-through path is to be set. If a new cut-through path is not to be set (No in the operation S17), the process goes to an operation S19. If a new cut-through path is to be set (Yes in the operation S17), in an operation S18, the cut-through path is set for each node. In the operation S19, the input node of the cut-through path is instructed to switch to the cut-through path. In an operation S20, an instruction to set the interfaces of the network devices on the old path to the power saving mode is issued.

FIG. 13 illustrates an exemplary process for removing the cut-through path. Referring to FIG. 13, in an operation S21, the amount of power consumption of each node is collected. In an operation S22, it is determined whether the power consumption of the electrical node is lower than or equal to a threshold value, for example, the power consumption of the optical node. If the power consumption of the electrical node is higher than the threshold value (No in the operation S22), the process goes back to the operation S21. If the power consumption of the electrical node is lower than or equal to the threshold value (Yes in the operation S22), in an operation S23, it is determined whether a predetermined time elapsed since the previous cut-through path was set. If the predetermined time did not elapse (No in the operation S23), the process goes back to the operation S21. If the predetermined time elapsed (Yes in the operation S23), in an operation S24, an instruction to perform the normal operation is issued to the interfaces of the network devices on the old path before the cut-through path is set. In an operation S25, the path is switched to the old path. Accordingly, the cut-through path is not used. In an operation S26, it is determined whether the cut-through path is capable of being removed. It may be determined that the cut-through path is capable of being removed if the power consumption of the entire cut-through path is higher than the power consumption of the entire old path. If the cut-through path is not capable of being removed (No in the operation S26), in an operation S28, the old path is removed again and the cut-through path is kept. Then, the process is terminated. If the cut-through path is capable of being removed (Yes in the operation S26), in an operation S27, the cut-through path is removed. Then, the process is terminated.

Figure 14:
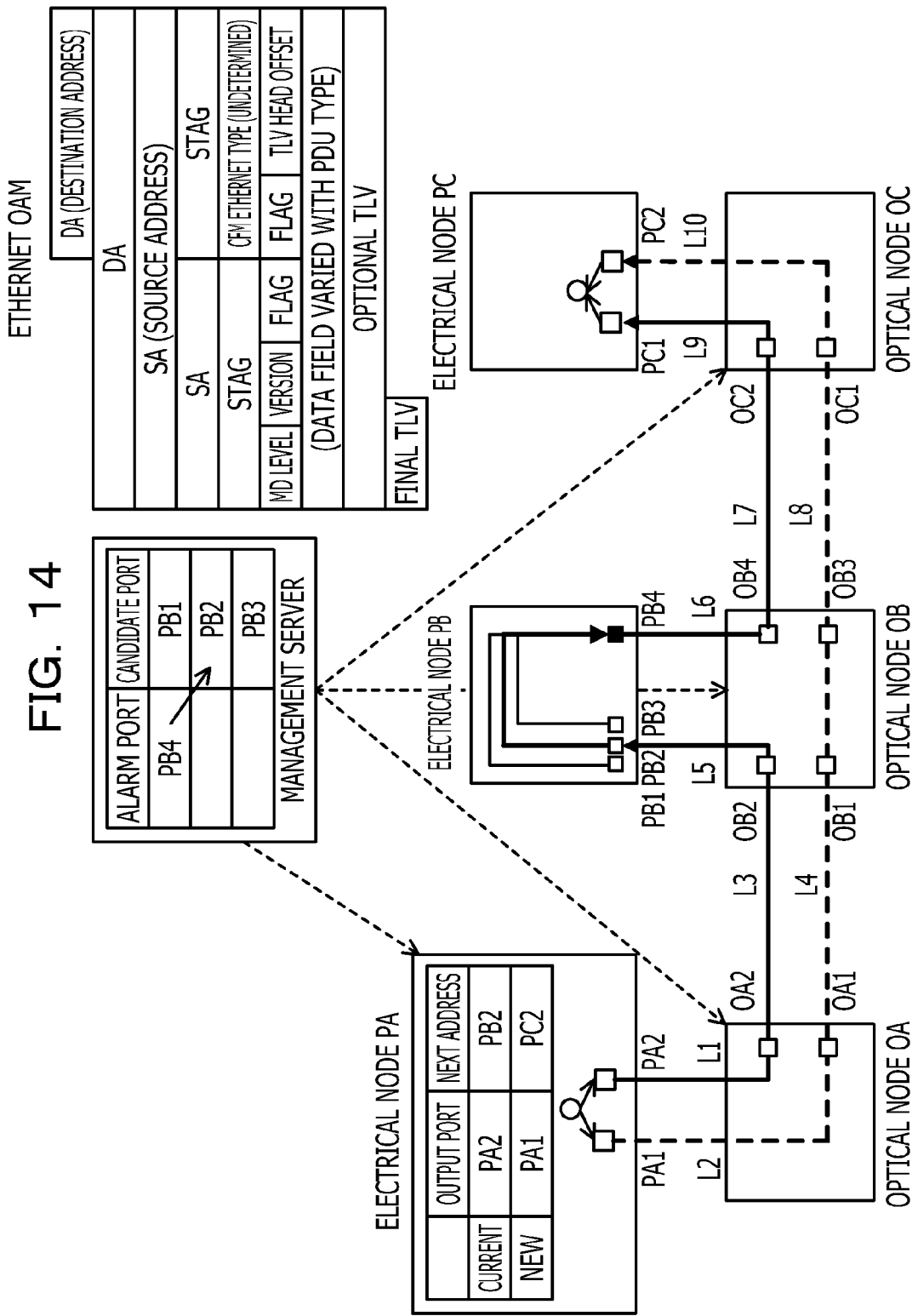
FIG. 14 illustrates an exemplary power saving instruction.

FIG. 14 illustrates an exemplary power saving instruction. The instruction illustrated in FIG. 14 is issued to the nodes. When the Ethernet is used as the electrical layer, the frame of Ethernet Operation Administration and Maintenance (OAM)

may be used to issue an instruction to switch to the power saving mode to each electrical node. In the Ethernet OAM, codes for the power saving mode may be defined in option codes, for example, OpCode of the frame of the Ethernet OAM illustrated in FIG. 14. When a control plane is used in the optical layer, the control plane may be used to issue the power saving instruction to each optical node. The management server may directly issue the power saving instruction to each node.

Figure 15:
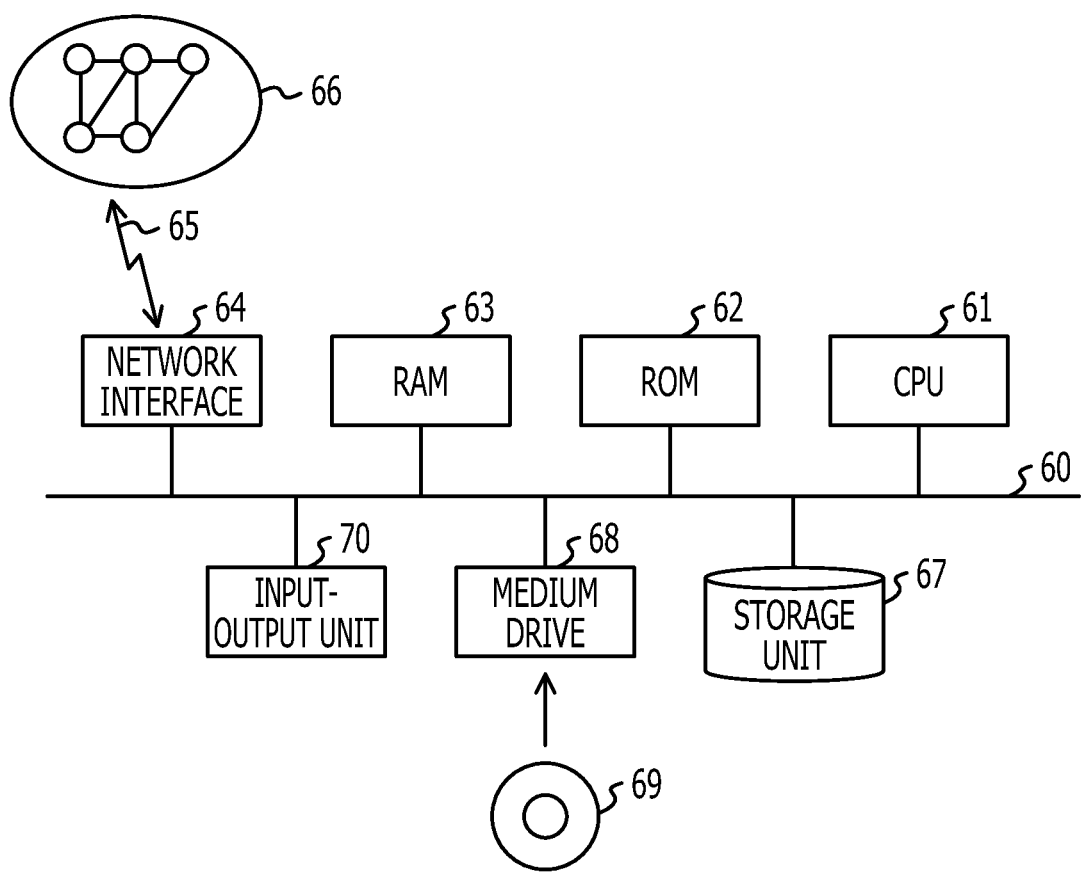
FIG. 15 illustrates an exemplary management server.

FIG. 15 illustrates an exemplary management server. The hardware of the management server may be illustrated in FIG. 15. The processing in the management server may be executed by programs in the management server illustrated in FIG. 15.

Referring to FIG. 15, a central processing unit (CPU) 61, a read only memory (ROM) 62, a random access memory (RAM) 63, a network interface 64, a storage unit 67, a medium drive 68, and an input-output unit 70 are coupled to a bus 60.

The CPU 61 may read a basic program, such as Basic Input/Output System (BIOS), stored in the ROM 62 coupled via the bus 60 to perform the function of the management server. A program executing, for example, the process illustrated in FIG. 12 or FIG. 13 may be stored in the storage unit 67, such as a hard disk. The program is decompressed in the RAM 63 coupled via the bus 60. The CPU 61 may execute the program decompressed in the RAM 63 to perform the above process in the management server.

The program may be stored in a portable recording medium 69. In this case, the program may be read from the portable recording medium 69 by the medium drive 68 to be decompressed in the RAM 63. The CPU 61 may execute the program. The portable recording medium 69 is, for example, a flexible disk, a compact disk-read only memory (CD-ROM), a digital versatile disk (DVD), a Blue-ray disc, or an integrated circuit (IC) memory.

The input-output unit 70 includes a keyboard, a mouse, a printer, and/or a display. The manager using the management server may input information with the input-output unit 70 and information may be presented to the manager with the input-output unit 70.

The network interface 64 communicates with a network 66 to be managed through a line 65. The network interface 64 may receive information about the power consumption transmitted from the network 66, may set the cut-through path in the network 66, and/or may transmit the instruction to perform the power saving operation to the network 66.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A network control apparatus comprising:
a processor coupled to a memory which stores a program to be executed by the processor, the processor, based on the program, performs operations to:
collect power consumption information measured by at least one electrical node included in an electrical layer network and at least one optical node included in an optical layer network;
calculate an optical cut-through path based on the collected power consumption information; and
instruct the electrical node and the optical node to set the optical cut-through path based on the calculation result,
wherein the optical cut-through path is set by removing a route to the electrical node from a path before the optical cut-through path is set.
2. The network control apparatus according to claim 1, wherein the processor instructs the electrical node and the optical node to set the optical cut-through path if power consumption when the optical cut-through path is set is lower than power consumption when the optical cut-through path is not set.
3. The network control apparatus according to claim 1, wherein information is transferred in the electrical layer network by electrical processing, and
wherein information is transferred in the optical layer network by optical processing.
4. The network control apparatus according to claim 1, wherein the electrical node and the optical node each measure power consumption for each line interface or for each line port and power consumption of the entire node.
5. The network control apparatus according to claim 1, wherein the power consumption information collected by the processor is held for each node.
6. The network control apparatus according to claim 1, wherein, when the optical cut-through path is set, the electrical node corresponding to an input node of the optical cut-through path notifies only the electrical node included in the optical cut-through path of the setting.
7. The network control apparatus according to claim 6, wherein the electrical node corresponding to the input node transfers a message to instruct power saving to a route to the electrical node corresponding to an output node of the optical cut-through path in an electrical layer and the electrical node included in the route performs a power saving operation.
8. The network control apparatus according to claim 1, wherein the processor instructs the node on a path before the optical cut-through path is set to perform a power saving operation.
9. The network control apparatus according to claim 8, wherein the processor removes the optical cut-through path if an amount of power consumption of the path is below an amount of power consumption of the optical cut-through path.
10. A network control system comprising:
at least one electrical node including a first power consumption measurer that measures power consumption;
at least one optical node including a second power consumption measurer; and
a management server, wherein the management server performs operations to:
collect power consumption information measured by the electrical node and the optical node,
calculate an optical cut-through path based on the collected power consumption information, and
instruct the electrical node and the optical node to set the optical cut-through path based on the calculation result of the cut-through range identifying unit, wherein the optical cut-through path is set by removing a route to the electrical node from a path before the optical cut-through path is set.

11. The network control system according to claim 10, wherein the management server instructs the electrical node and the optical node to set the optical cut-through path if power consumption when the optical cut-through path is set is lower than power consumption when the optical cut-through path is not set.

12. A network control method comprising:

collecting power consumption information measured by at least one electrical node included in an electrical layer network and at least one optical node included in an optical layer network;

calculating an optical cut-through path based on the collected power consumption information; and instructing the electrical node and the optical node to set the optical cut-through path based on the calculation result, wherein the optical cut-through path is set by removing a route to the electrical node from a path before the optical cut-through path is set.

13. The network control method according to claim 12, wherein the instructing instructs the electrical node and the optical node to set the optical cut-through path if power consumption when the optical cut-through path is set is lower than power consumption when the optical cut-through path is not set.

* * * * *